(12) United States Patent
Eskew et al.

(10) Patent No.: US 6,536,124 B1
(45) Date of Patent: Mar. 25, 2003

(54) ANGULAR MEASURING AND SAW ANGLE SETTING DEVICE

(75) Inventors: Clyde Eskew, 3642 Circle Drive Pl., Grove, OK (US) 74344; Jerry L. Lindsay, Grove, OK (US)

(73) Assignee: Clyde Eskew, Grove, OK (US)

( * ) Notice: Subject to any disclaimer, the term of this patent is extended or adjusted under 35 U.S.C. 154(b) by 62 days.

(21) Appl. No.: 09/711,720

(22) Filed: Nov. 13, 2000

Related U.S. Application Data

(60) Provisional application No. 60/165,631, filed on Nov. 15, 1999.

(51) Int. Cl.[7] ............... B43L 7/10; G01B 3/56
(52) U.S. Cl. .............. 33/471; 33/679.1; 33/538
(58) Field of Search ............ 33/452, 465, 453, 33/471, 628, 640, 641, 679.1, 534, 538

(56) References Cited

U.S. PATENT DOCUMENTS

| | | | |
|---|---|---|---|
| 101,477 A | | 4/1870 | Littlefield |
| 726,973 A | | 5/1903 | McKinnon |
| 1,243,343 A | * | 10/1917 | Roberts ............... 33/471 |
| 1,299,978 A | * | 4/1919 | MacDowney ............... 33/471 |
| 1,390,821 A | * | 9/1921 | Seals ............... 33/465 |
| 1,440,284 A | * | 12/1922 | Engstrom ............... 33/471 |
| 1,839,014 A | * | 12/1931 | DeGuerre ............... 33/471 |
| 1,878,119 A | * | 9/1932 | Dowd ............... 33/471 |
| 2,064,430 A | * | 12/1936 | Johnson ............... 33/471 |
| 2,607,121 A | | 8/1952 | Wiedebusch |
| 2,899,750 A | * | 8/1959 | Becroft ............... 33/465 |
| 3,009,250 A | | 11/1961 | Schock |
| 3,070,887 A | | 1/1963 | Olsen |
| 4,481,720 A | | 11/1984 | Sury |
| 4,744,152 A | | 5/1988 | Roach et al. |
| 4,901,444 A | | 2/1990 | Maschmeier |
| 5,117,560 A | | 6/1992 | Nevins |
| 5,187,877 A | | 2/1993 | Jory et al. |
| 5,189,804 A | | 3/1993 | Ostachowski |
| 5,539,991 A | * | 7/1996 | Harrison ............... 33/471 |
| 5,669,149 A | | 9/1997 | Meitzler |

* cited by examiner

*Primary Examiner*—Diego Gutierrez
*Assistant Examiner*—Mirellys Jagan
(74) *Attorney, Agent, or Firm*—James R. Head

(57) ABSTRACT

A connected and relatively pivotal two piece angular measuring device that will provide information and/or direct data or indicia to be used in setting mitre saw cutting angles for accurate placement of trim, molding, shelves, and the like.

4 Claims, 7 Drawing Sheets

ANGULAR MEASURING AND SAW ANGLE SETTING DEVICE

CROSS REFERENCE TO RELATED APPLICATION

This application claims the benefit of U.S. Provisional Application Ser. No. 60/165,631, filed Nov. 15, 1999, entitled "Angular Measuring & Saw Angle Setting Device."

SUBJECT MATTER OF THE INVENTION

This invention relates to the field of geometrical angular measuring to provide saw angular settings where parts, particularly in carpentry work, are to be joined.

BACKGROUND OF THE INVENTION

In carpentry work, a common problem in the cutting of trim, molding, shelves and the like, is that many times the angles are not what they are suppose to be. Especially is this true where there is an angular junction. That is, if an angle is suppose to be 90°, very often it is not. If the carpenter assumes it is 90, when it is, for example 87°, then when he cuts the connecting trim, etc., at 45° there will be an imperfect fit. Very often the carpenter has no convenient way to obtain the exact angle to provide the angular setting of a table or miter saw. Thus the carpenter usually ends up wasting much time, cutting and trying until the pieces fit. Any thing less than an experienced craftsman ends up with misfitting junctions.

There are many patented angle measuring devices, such as the well known "carpenter's square" and those shown in U.S. Pat. Nos. 101,477; 726,973; 2,607,121; 3,009,250; 3,070,887; 4,481,720; 4,744,152; 4,901,444; 5,117,560; 5,187,877; 5,189,804; 5,539,991; and 5,669,149. U.S. Pat. No. 5,117,550 provides a means to obtain a reading for the setting of the Miter saw. However it is a two piece device, one for measuring the angle, the second, a protractor, for reading the actual angle and the required saw angle. The one used to measure the angle is placed, and bolted, into position upon the protractor. Such a device is cumbersome to use and, being two pieces, not always handy or lost on the job.

OBJECTS OF THE INVENTION

It is a primary object of this invention to provide a device for measuring the true corner angles in trim and other carpentry uses.

It is another object of this invention to provide a device for measuring the true angle in trim and other carpentry uses which provides information and/or read-out indicia of the proper sawing angle for trim, molding, shelving, etc.

It is another object of this invention to provide a device for measuring the true angle in preparing trim and other carpentry uses which provides inside and outside corner saw angle readings.

SUMMARY OF THE INVENTION

This invention is a pivotally connected two piece angular measuring device that will give the carpenter, no matter of what experience, the capabilities of measuring angles that have to be taken from a surface, an edge, or a corner, for a subsequent operation. The device has a scale that reads not only the whole or true actual angle, the bisected angle, and/or the actual saw angle. As such the device of this invention provides easy determination of a miter angle and setting for a miter saw. The device is particularly adaptable and easy to use for those working with door facing molding, wall trim, chair rail, cove molding, crown molding, book shelves, baseboard, and other joinery needs. It is also adaptable for other non-carpentry work and installation, such as plumbing, electrical conduit, etc, or anywhere that angular measurements are needed to achieve high standards of accuracy and precision.

In particular the preferred device of this invention will provide saw, such as miter saw, angle settings for trim carpentry work. The device comprises two pivotally connected arms. The first arm has an outer straight edge and a face upon which are first and second angular scale markings. These scales comprise radial markings on a segment of a circle. The first angular scale representing true angle of the position of the two outer straight edges relative to each other. The second angular scale represents the 180° complement of the true angle.

The second arm has an outer straight edge and a face upon which is a pointer means and angular scale markings that coincide with the angular scales on the first arm. The pivot point of the two arms defines the center point of the of the first and second radial scale markings. Means are provided to indicate to the carpenter the saw settings to achieve a properly fitted piece of trim. This may come in the form of actual indicia on the face of the first arm, or by way of calculation.

DETAILED DESCRIPTION OF THE INVENTION

Figure 1:
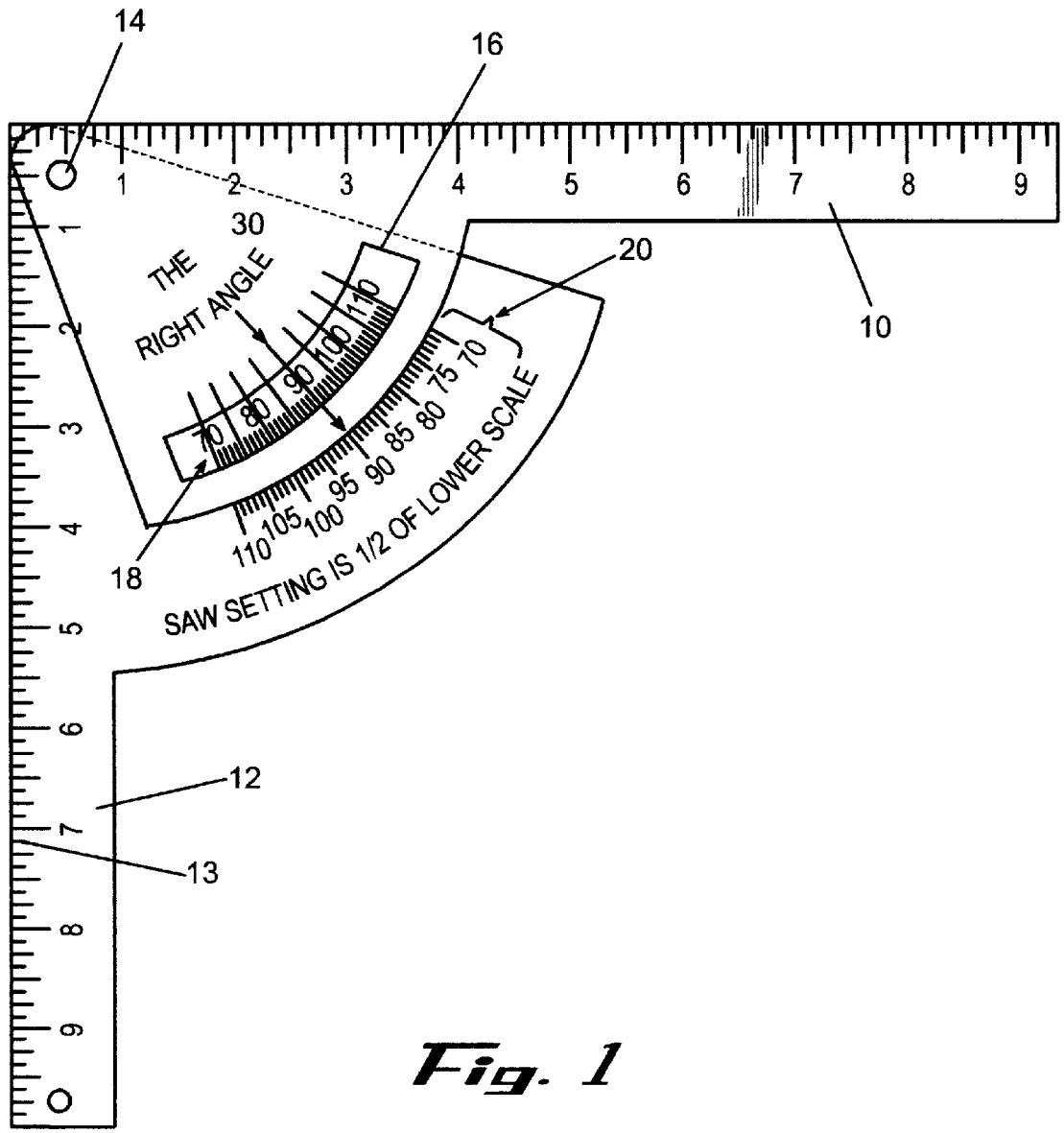
FIG. 1 is a top plan view of the assembled device of this invention.
Figure 2:
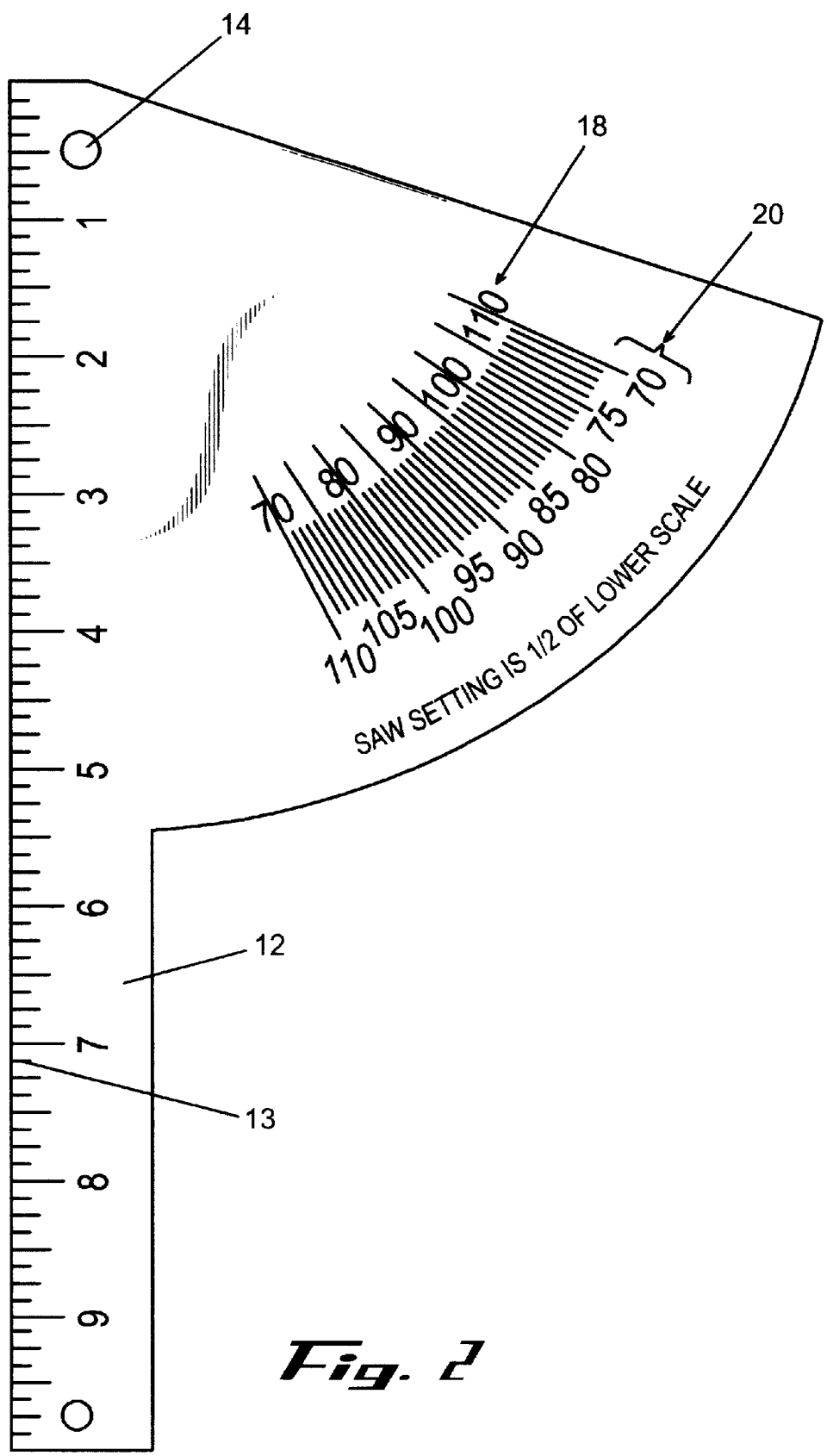
FIG. 2 is a top plan view of the first arm of the device of FIG. 1.
Figure 3:
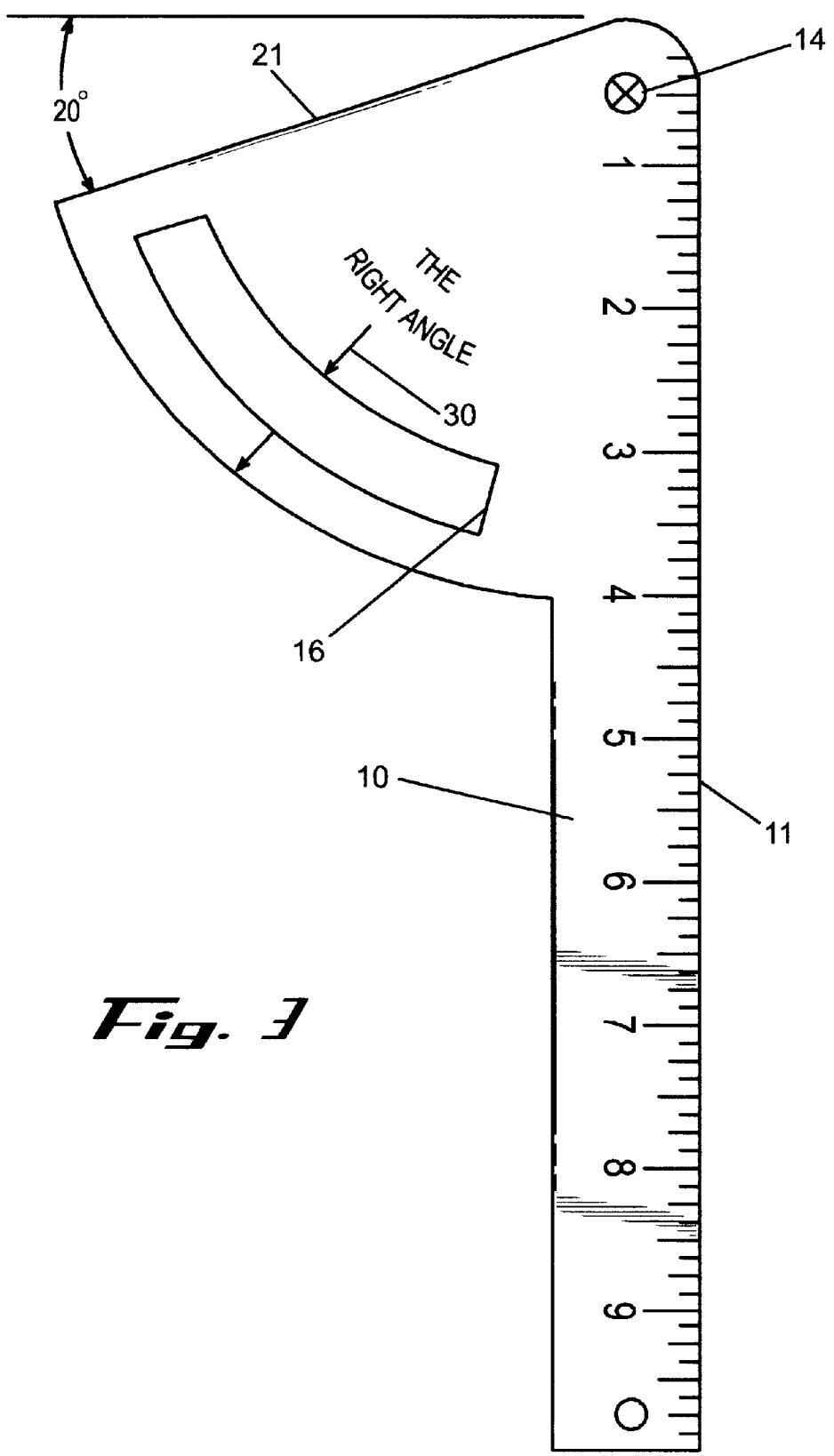
FIG. 3 is a top plan view of the second arm of the device of FIG. 1.
Figure 4:
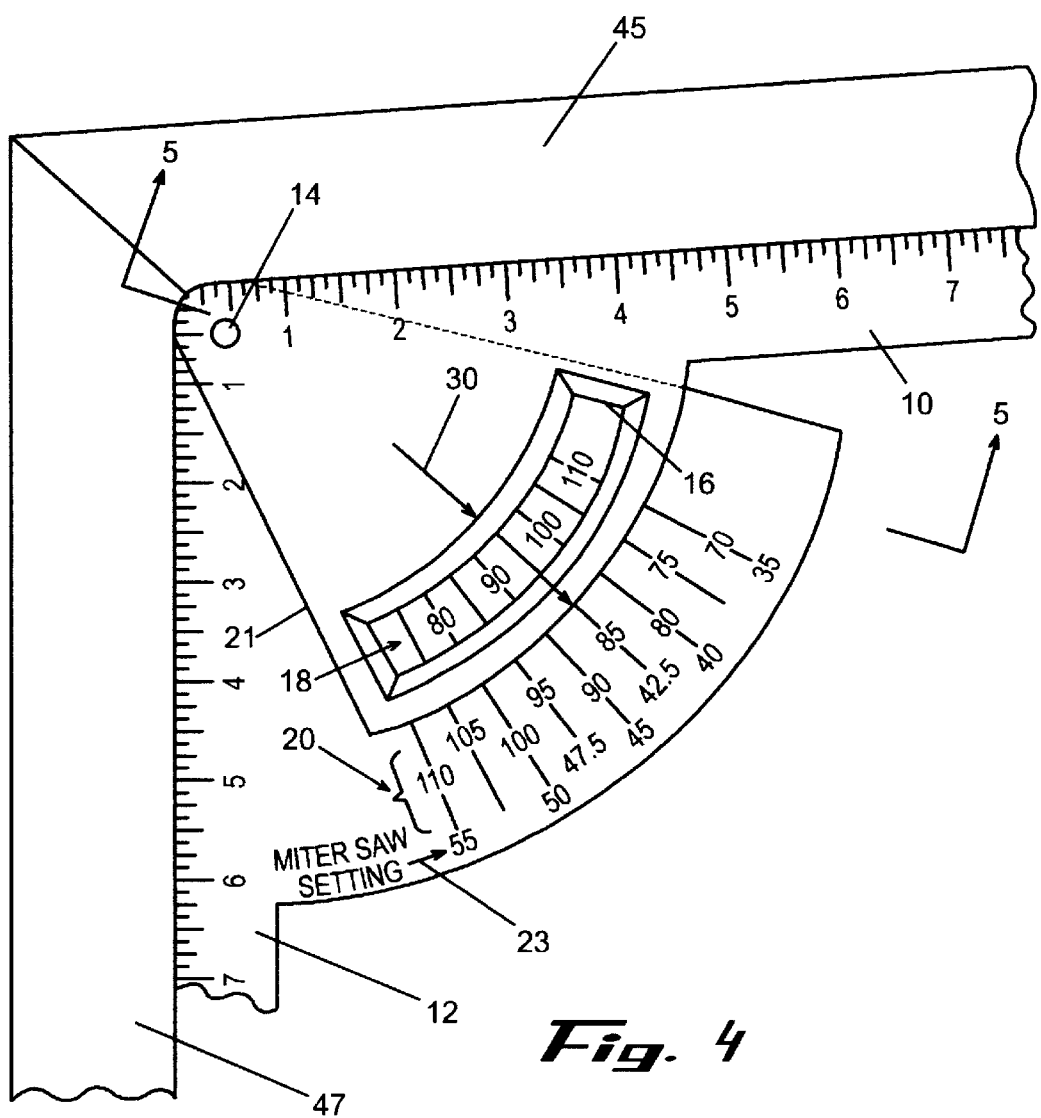
FIG. 4 is a top plan view of another embodiment of this invention.
Figure 5:
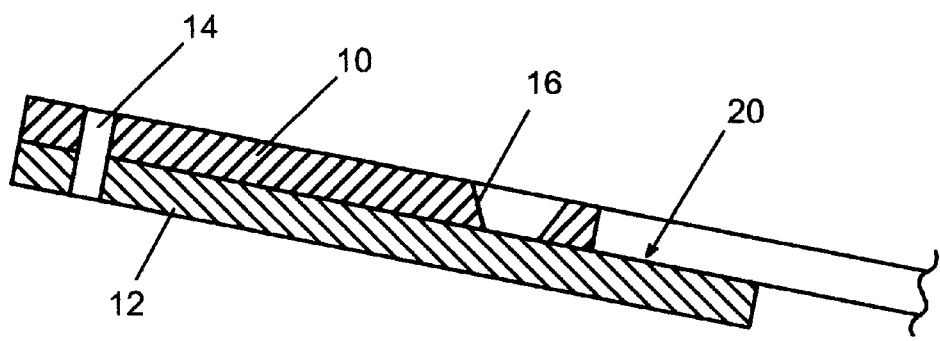
FIG. 5 is a sectional view taken along the line 5—5 of FIG. 4.

Referring now to FIGS. 1–5, the device is comprised of two arm members, upper arm 10 and lower arm 12. These members are pivoted to each other at 14. Upper arm member 10 has an opening 16 (preferably beveled as shown in FIGS. 4 and 5) and a primary reading indicia, cursor or pointer 30 adjacent an upper scale 18 and a lower scale 20, that follow the bevel surfaces of opening 16 for ease of reading scales 18 and 20 found on member 12. The readable scale 18 represents the actual angle, from 70° to 110°, that is between straight edge 11 of arm 10 and straight edge 13 of arm 12. Edge 21 (FIGS. 1,3, and 4) of upper arm 10 is at an angle (FIG. 3) relative to a line normal or perpendicular to straight edge 11. In this case that angle is 20°.

The center of pivot 14 is the center of radial scale graduations 17, 18, and 20 which are placed on the segment of a circle.

The user will place the device in the area to be measured and read the angle through window 16. He then reads the complementary angle on scale 20. A skilled user will then know that the angle to set the miter saw blade will be ½ of the reading from scale 20.

The device has other uses including pure angle measurements or linear measuring using the inch, or metric graduations found on the outer straight edges, 11 and 13, of respective members 10 and 12.

FIG. 4 is an diagrammatic view of a typical use of the invention in cutting inside corner molding pieces 45 and 47, such as a baseboard or door face, where the rough carpentry of the base or door is not exactly square. For instance, the carpenter would then place the device of this invention in the inside corner as shown and read cursor or pointer 30 as an actual angle of 95 degrees. He would then read on scale 20 the compliment angle of 85 degrees. This would then advise the user of a miter saw setting of 42.5 degrees to satisfy the angle of the molding joint as shown in FIG. 4. In this embodiment, the miter saw settings 23 are imprinted on the lower arm 12, as shown.

Figure 6:
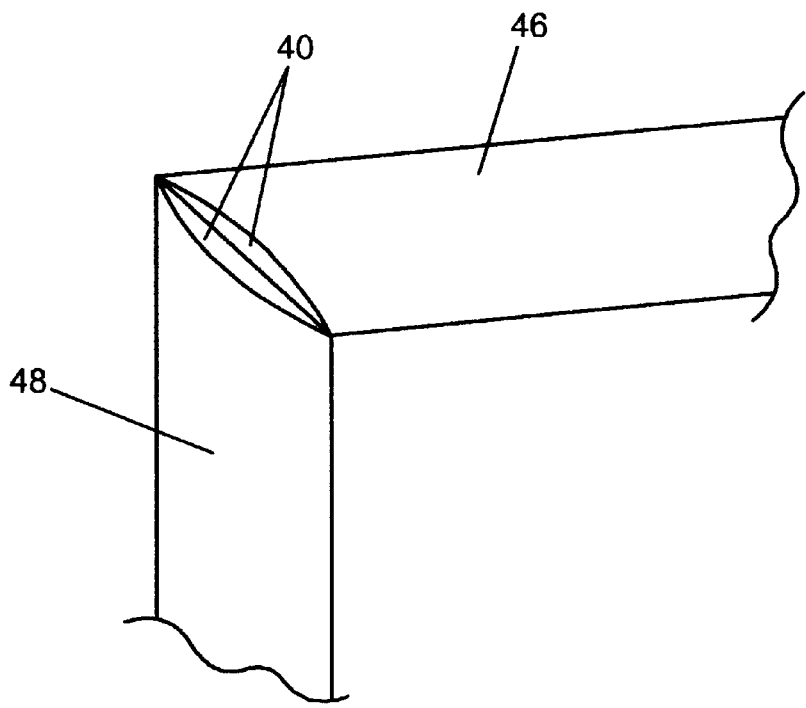
FIG. 6 is a partial view of an angular molding joint where the carpenter has used the wrong data.

FIG. 6 represents the results of joining corner molding 46 and 48 where many carpenters misread the proper miter joint saw angle. Many would read 95 degrees then divide that by ½ to arrive at an angle of 47.5 degrees. As a consequence the joint will never fit leaving a gap 40. The molding is then usually cut and recut until it fits or, in many cases, filled with calk or plastic wood. To have an exact miter joint not only saves time but saves waste of expensive molding.

Figure 7:
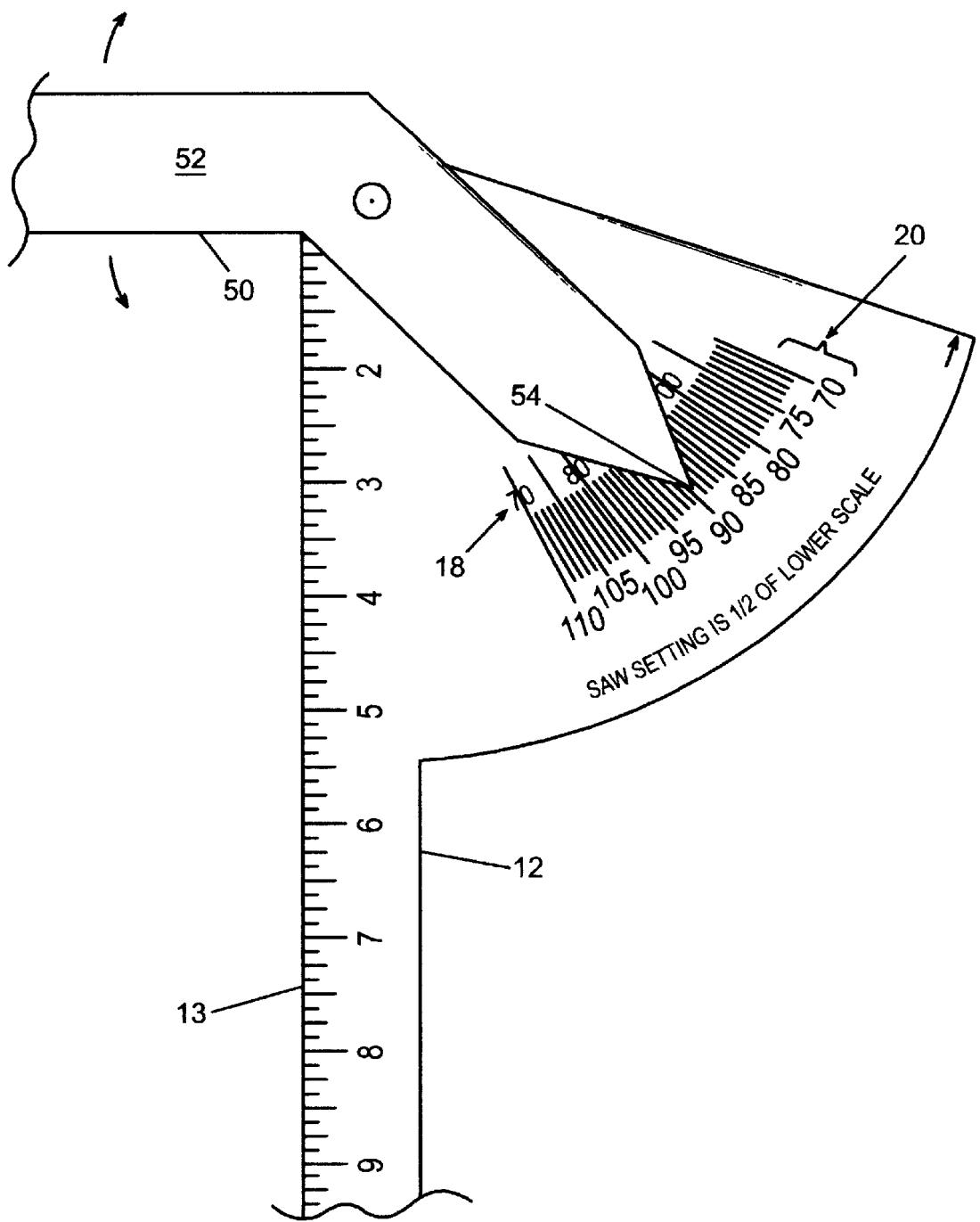
FIG. 7 is a top plan view of an alternate embodiment for measuring outside true and saw angle settings.
Figure 8:
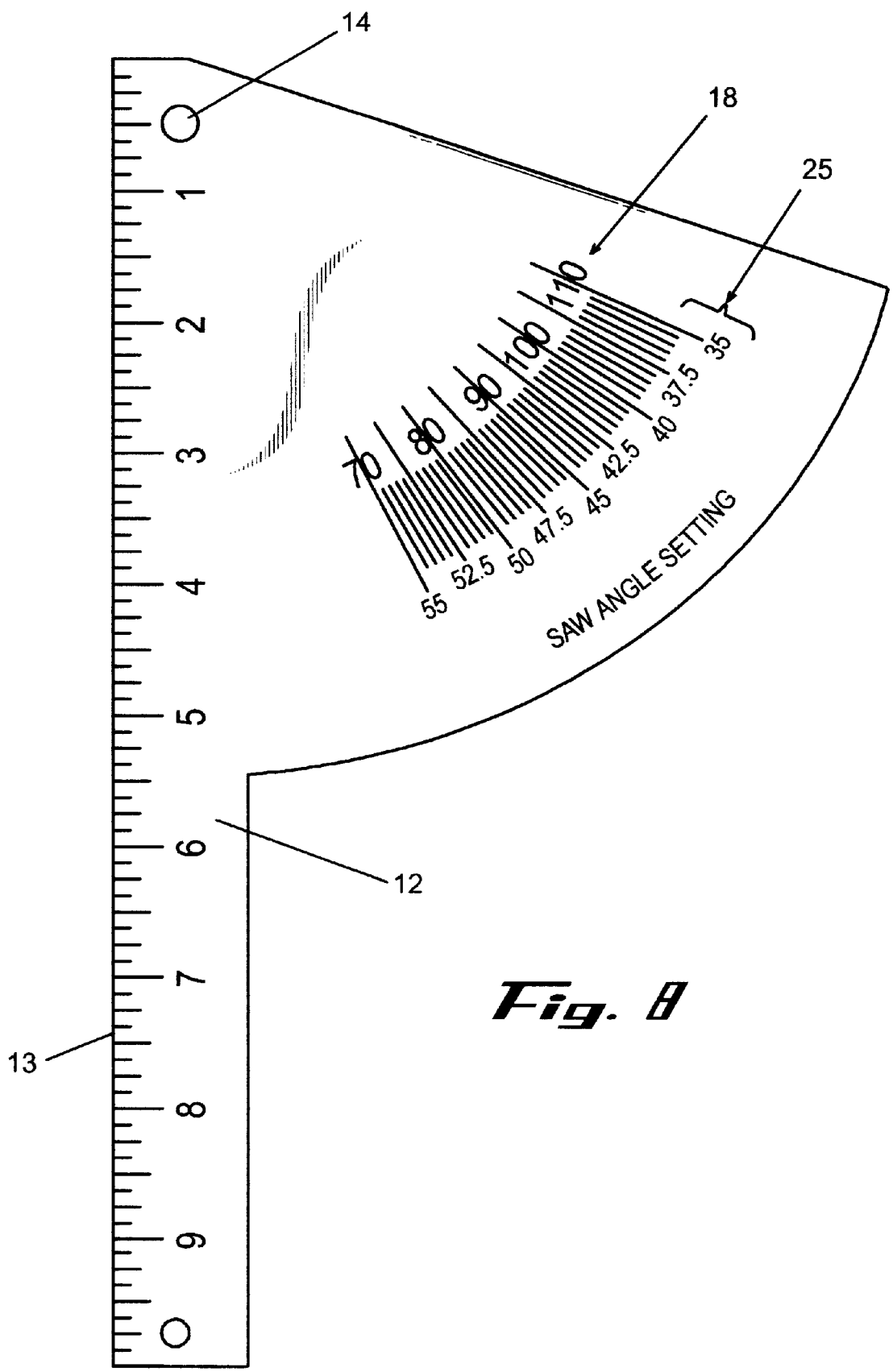
FIG. 8 is an alternate embodiment for the lower arm wherein the exact saw settings are place on the face of the device.

Referring now to FIG. 7, the embodiment is for measuring outside corner angle between straight edge 13 of lower member 12 and edge 50 of the member 52. That angle is read via pointer 54 directly on scale 20, scale 18 being of no use in this invention. As in the embodiments of this invention, the miter saw angle is one-half of the reading.

One modification of this invention, not shown, is the use of a digital, instead of analog, read-out of the angles shown. A form of digital reading means would transform the angular indicia 18 and/or 20 into electrical signals or representations along with a control and display unit for manipulating and subsequently recording and displaying the needed angles and miter saw data. Procedures, for instance taught in U.S. Pat. No. 5,027,526, using bar code imprinted on the member 12 and read by an optical reader on member 10, or vice versa, are to be adapted to provide the necessary angular measurements and saw setting data as disclosed herein.

Other modifications and variations of the present invention are possible in light of the above teachings and within the scope of the appended claims without departing from the spirit and intended scope of the invention.

We claim:

1. A device for providing saw cutting angle settings for each of two corner members which form an angular inside junction, comprising:

a first arm having an outer straight edge, for positioning against one of said two corner members, and a semi-circular face upon which are first and second readable angular scale markings on a segment of a circle, said first and second angular scale markings radiating from a fixed center point, said first angular scale markings representing a true angle, said second angular scale markings representing the 180° complement angle to said first angular scale markings;

a pivot point on said first arm which defines said fixed center point of said first and second readable angular scale markings;

a second arm positioned above said first arm and connected to and pivotal relative to said first arm about said pivot point, said second arm having an outer straight edge for positioning against the other of said two corner members, and a semi-circular face having an arcuate window positionable relative to said first angular scale markings, said semi-circular face of said second arm having an outer edge which is at an angle of 20° relative to a line normal to said outer straight edge;

a pointer means adjacent said arcuate window to determine said true angle and said saw cutting angle; and means to determine a saw setting from a position of said pointer relative to said second readable angular scale markings.

2. The device of claim 1 wherein said means to determine said saw setting will equal one-half of said second scale.

3. The device of claim 1 wherein said means to determine said saw setting is from a set of third readable angular scale markings coincident with said second angular scale that indicates saw angle settings equal to one-half of said second angular scale.

4. The device of claim 1 wherein said first readable angular scale markings are between 70° and 110°.

* * * * *